US008650286B1

(12) United States Patent
Sajassi et al.

(10) Patent No.: US 8,650,286 B1
(45) Date of Patent: *Feb. 11, 2014

(54) PREVENTION OF LOOPING AND DUPLICATE FRAME DELIVERY IN A NETWORK ENVIRONMENT

(75) Inventors: Ali Sajassi, San Ramon, CA (US); Samer Salam, Vancouver (CA)

(73) Assignee: Cisco Technology, Inc., San Jose, CA (US)

( * ) Notice: Subject to any disclaimer, the term of this patent is extended or adjusted under 35 U.S.C. 154(b) by 123 days.

This patent is subject to a terminal disclaimer.

(21) Appl. No.: 13/087,259

(22) Filed: Apr. 14, 2011

Related U.S. Application Data

(63) Continuation of application No. 13/069,249, filed on Mar. 22, 2011.

(51) Int. Cl.
*G06F 15/173* (2006.01)

(52) U.S. Cl.
USPC .......................... 709/224; 370/389; 370/432

(58) Field of Classification Search
USPC .......................................... 370/390, 432, 218
See application file for complete search history.

(56) References Cited

U.S. PATENT DOCUMENTS

| 4,706,080 | A | 11/1987 | Sincoskie |
| 4,811,337 | A | 3/1989 | Hart |
| 5,394,402 | A | 2/1995 | Ross |
| 5,742,604 | A | 4/1998 | Edsall et al. |
| 5,761,435 | A | 6/1998 | Fukuda et al. |
| 5,818,842 | A | 10/1998 | Burwell et al. |
| 5,848,227 | A | 12/1998 | Sheu et al. |
| 5,878,232 | A | 3/1999 | Marimuthu |
| 6,055,364 | A | 4/2000 | Speakman et al. |
| 6,073,176 | A | 6/2000 | Baindur et al. |
| 6,078,590 | A | 6/2000 | Farinacci et al. |
| 6,188,694 | B1 | 2/2001 | Fine et al. |
| 6,301,244 | B1 | 10/2001 | Huang et al. |

(Continued)

FOREIGN PATENT DOCUMENTS

| CN | 1604545 | 4/2005 |
| EP | 1388979 | 2/2004 |
| WO | WO 2007/031002 | 3/2007 |
| WO | WO 2008/089370 | 7/2008 |

OTHER PUBLICATIONS

USPTO Sep. 30, 2011 Notice of Allowance from U.S. Appl. No. 11/857,711.

(Continued)

*Primary Examiner* — Dustin Nguyen
(74) *Attorney, Agent, or Firm* — Patent Capital Group

(57) ABSTRACT

Methods, systems, and apparatus, including computer programs encoded on a storage media, for preventing looping and duplicate frame delivery in a network environment. A first control plane message is received from a first edge node in a plurality of edge nodes in a plurality of network elements of a network, the first control plane message identifying a first hint to be included in first multicast packets that include data originating from a first computing device interfaced with the first edge node and are forwarded to the network through the first edge node. A data record is stored identifying the association between the first hint and the first computing device. The data record is used to determine that multicast packets including the first hint originate from the first computing device and are not to be forwarded to the first computing device by edge nodes interfacing with the first computing device.

20 Claims, 8 Drawing Sheets

(56) References Cited

U.S. PATENT DOCUMENTS

| | | |
|---|---|---|
| 6,308,282 B1 | 10/2001 | Huang |
| 6,373,838 B1 | 4/2002 | Law et al. |
| 6,424,657 B1 | 7/2002 | Voit et al. |
| 6,430,621 B1 | 8/2002 | Srikanth et al. |
| 6,484,209 B1 | 11/2002 | Momirov |
| 6,502,140 B1 | 12/2002 | Boivie |
| 6,611,869 B1 | 8/2003 | Eschelbeck et al. |
| 6,667,982 B2 | 12/2003 | Christie et al. |
| 6,668,282 B1 | 12/2003 | Booth, III et al. |
| 6,732,189 B1 | 5/2004 | Novaes |
| 6,757,286 B1 | 6/2004 | Stone |
| 6,763,469 B1 | 7/2004 | Daniely |
| 6,765,907 B1 * | 7/2004 | Xu et al. .................. 370/390 |
| 6,785,232 B1 | 8/2004 | Kotser et al. |
| 6,785,265 B2 | 8/2004 | White et al. |
| 6,789,121 B2 | 9/2004 | Lamberton et al. |
| 6,798,775 B1 | 9/2004 | Bordonaro |
| 6,801,533 B1 | 10/2004 | Barkley |
| 6,813,268 B1 | 11/2004 | Kalkunte et al. |
| 6,826,698 B1 | 11/2004 | Minkin et al. |
| 6,829,252 B1 | 12/2004 | Lewin et al. |
| 6,839,348 B2 | 1/2005 | Tang et al. |
| 6,850,521 B1 | 2/2005 | Kadambi et al. |
| 6,850,542 B2 | 2/2005 | Tzeng |
| 6,852,542 B2 | 2/2005 | Mandel et al. |
| 6,882,643 B1 | 4/2005 | Mauger et al. |
| 6,892,309 B2 | 5/2005 | Richmond et al. |
| 6,937,576 B1 | 8/2005 | Di Benedetto et al. |
| 6,954,436 B1 | 10/2005 | Yip |
| 7,009,983 B2 | 3/2006 | Mancour |
| 7,092,389 B2 | 8/2006 | Chase et al. |
| 7,113,512 B1 | 9/2006 | Holmgren et al. |
| 7,116,665 B2 | 10/2006 | Balay et al. |
| 7,173,934 B2 | 2/2007 | Lapuh et al. |
| 7,277,936 B2 | 10/2007 | Frietsch |
| 7,310,342 B2 | 12/2007 | Rouleau |
| 7,343,423 B2 | 3/2008 | Goguen et al. |
| 7,345,991 B1 | 3/2008 | Shabtay et al. |
| 7,408,936 B2 | 8/2008 | Ge et al. |
| 7,466,703 B1 | 12/2008 | Arunachalam et al. |
| 7,643,409 B2 | 1/2010 | Voit et al. |
| 7,860,093 B2 * | 12/2010 | Shepherd et al. ........... 370/390 |
| 7,860,121 B2 * | 12/2010 | Chen .................. 370/432 |
| 7,933,268 B1 * | 4/2011 | Melman et al. ............. 370/389 |
| 8,451,715 B1 * | 5/2013 | Doshi et al. ............... 370/218 |
| 2002/0032780 A1 | 3/2002 | Moore et al. |
| 2002/0087721 A1 | 7/2002 | Sato et al. |
| 2002/0196795 A1 | 12/2002 | Higashiyama |
| 2003/0012183 A1 | 1/2003 | Butler et al. |
| 2003/0026271 A1 | 2/2003 | Erb et al. |
| 2003/0036375 A1 | 2/2003 | Chen et al. |
| 2003/0101243 A1 | 5/2003 | Donahue et al. |
| 2003/0110268 A1 | 6/2003 | Kermarec et al. |
| 2003/0112781 A1 | 6/2003 | Kermode et al. |
| 2003/0142674 A1 | 7/2003 | Casey |
| 2003/0154259 A1 | 8/2003 | Lamberton et al. |
| 2003/0174706 A1 | 9/2003 | Shankar et al. |
| 2003/0177221 A1 | 9/2003 | Ould-Brahim et al. |
| 2004/0095940 A1 | 5/2004 | Yuan et al. |
| 2004/0102182 A1 | 5/2004 | Reith et al. |
| 2004/0125809 A1 | 7/2004 | Jeng |
| 2004/0141501 A1 | 7/2004 | Adams et al. |
| 2004/0151180 A1 | 8/2004 | Hu et al. |
| 2004/0158735 A1 | 8/2004 | Roese |
| 2004/0165525 A1 | 8/2004 | Burak |
| 2004/0165600 A1 | 8/2004 | Lee |
| 2004/0172559 A1 | 9/2004 | Luo et al. |
| 2004/0228291 A1 | 11/2004 | Huslak et al. |
| 2004/0233891 A1 | 11/2004 | Regan et al. |
| 2004/0252717 A1 | 12/2004 | Solomon et al. |
| 2004/0264364 A1 | 12/2004 | Sato |
| 2005/0007951 A1 | 1/2005 | Lapuh et al. |
| 2005/0018605 A1 | 1/2005 | Foote et al. |
| 2005/0025143 A1 | 2/2005 | Chen et al. |
| 2005/0030975 A1 | 2/2005 | Wright et al. |
| 2005/0044262 A1 | 2/2005 | Luo |
| 2005/0044265 A1 | 2/2005 | Vinel et al. |
| 2005/0063397 A1 | 3/2005 | Wu et al. |
| 2005/0097219 A1 | 5/2005 | Goguen et al. |
| 2005/0099949 A1 | 5/2005 | Mohan et al. |
| 2005/0152370 A1 | 7/2005 | Meehan et al. |
| 2005/0157664 A1 | 7/2005 | Baum |
| 2005/0157721 A1 | 7/2005 | Rabie et al. |
| 2005/0157751 A1 | 7/2005 | Rabie et al. |
| 2005/0163049 A1 | 7/2005 | Yazaki et al. |
| 2005/0175022 A1 | 8/2005 | Nishimura et al. |
| 2005/0190773 A1 | 9/2005 | Yang et al. |
| 2005/0220014 A1 | 10/2005 | DelRegno et al. |
| 2005/0249124 A1 | 11/2005 | Elie-Dit-Cosaque et al. |
| 2005/0286503 A1 | 12/2005 | Oda et al. |
| 2006/0092847 A1 | 5/2006 | Mohan et al. |
| 2006/0098607 A1 | 5/2006 | Zeng |
| 2006/0182037 A1 | 8/2006 | Chen et al. |
| 2006/0248277 A1 | 11/2006 | Pande |
| 2006/0285500 A1 | 12/2006 | Booth |
| 2006/0285501 A1 | 12/2006 | Damm |
| 2007/0008982 A1 | 1/2007 | Voit et al. |
| 2007/0058638 A1 | 3/2007 | Guichard et al. |
| 2009/0073989 A1 | 3/2009 | Cai et al. |
| 2011/0286452 A1 * | 11/2011 | Balus et al. .................. 370/390 |
| 2012/0213222 A1 * | 8/2012 | Filsfils et al. ................ 370/390 |

OTHER PUBLICATIONS

U.S. Appl. No. 13/069,249, entitled "Prevention of Looping and Duplicate Frame Delivery in a Network Environment," filed Mar. 22, 2011, Inventors: Ali Sajassi, et al.

Blunk et al., "Extensible Authentication Protocol EAP," Draft RFC 2284; Feb. 2004, http://tools.ietf.org/html/draft-ietf-eap-rfc2284bis-09.

PCT International Search Report mailed Jun. 25, 2008 for PCT/US2008/051372; 2 pages.

PCT International Preliminary Report on Patentability (1 page) and Written Opinion of the International Searching Authority (5 pages) mailed Jul. 21, 2009 for PCT/US2008/051372.

PCT International Search Report mailed Dec. 26, 2006 for PCT/CN2006/002231 (Translation); 4 pages.

PCT International Preliminary Report on Patentability (1 page) and Written Opinion of the International Searching Authority (3 pages) mailed Mar. 18, 2008 for PCT/CN2006/002231 (Translation).

USPTO Apr. 29, 2011 Final Office Action from U.S. Appl. No. 11/857,711.

Fine, M. et al., "Shared Spanning Trees," Cisco Systems, Jan. 15, 1999, 30 pages http://www.ieee802.org/1/files/public/docs1999/sstp-ieee.pdf.

Finn, Norman, "Shared Spanning Treees IEEE 802.1s Multiple Spanning Trees for .1q," Cisco Systems, Jan. 27, 1999, 11 pages http://www.ieee802.org/1/files/public/docs1999/sstp-ieee-slides.pdf.

Hart, J., "Extending the IEEE 802.1 MAC Bridge Standard to Remote Bridges," IEEE Network, Jan. 1998, vol. 2, No. 1, [Abstract Only].

ISO/IEC 15802-3: 1998 ANSI/IEEE Std 802.1d, 1998, pp. 58-109 http://speed.cis.nctu.edu.tw/~ydlin/course/cn/exp/Exp_NBL/stp/802.1D-1998.pdf.

Lahti, "Quality of Service in the Point-to-Point Protocol over Ethernet," Oct. 1, 2000, 75 pages http://www.e.kth.se/~e95_pla/exjobb/doc/Lahti_Thesis_QoS_in_PPPOE.pdf.

Lasserre, Marc et al., "Virtual Private LAN Service over MPLS," Internet Draft Documents, Mar. 2003, 27 pages http://tools.ietf.org/pdf/draft-lasserre-vkompella-ppvpn-vpls-04.pdf.

Perlman, R., "Interconnections: Bridges and Routers," Copyright 1992 by Addison Wesley Publishing Company, Inc., pp. 54-64 [Description Only].

Delord, Simon, et al., "PWE3 Applications & OAM Scenarios," Pseudo-Wire Edge-to-Edge (PWE3) Working Group; Internet Draft, Internet Engineering Task Force, IETF, CH, No. 2, Oct. 1, 2005, XP015042128 ISSN: 0000-0004 abstract p. 10, paragraph 3 Section 3.1.1.1 on pp. 12-13; http://ftp.ist.utl.pt/pub/drafts/draft-delord-pwe3-oam-applications-02.txt.

(56) References Cited

OTHER PUBLICATIONS

Seaman, M., *High Availability Spanning Tree*, Rev, 1.1, Oct. 26, 1998 http://www.ieee802.org/1/files/public/docs1998/hasten7.pdf.

Yener, et al,, "Fault-Tolerant convergence Routing," Copyright 1994, IEEE http://www.ieee-icnp.org/1994/papers/1994-27.pdf.

USPTO Jul. 29, 2011 Request for Continued Examination and Amendment in Response to Final Office Action dated Apr. 29, 2011 from U.S. Appl. No. 11/857,711.

EPO Feb. 26, 2003 European Search Report for EP Application No. 02291952; 1 page.

Martini, Luca, "Encapsulation Methods for Transport of Ethernet Frames Over IP and MPLS Networks," Network Working Group, Internet Draft, Jul. 2002, XP002231555; 20 pages; http://tools.ietf.org/pdf/draft-martini-ethernet-encap-mpls-01.pdf.

Riverstone, "How Ethernet, RPR and MPLS Work Together," White Paper from Riverstone Networks, Sep. 2001, pp. 1-19 XP002231554; http://www.riverstonenet.tom/pdf/unified_future.pdf.

Cisco Systems, Inc., Cisco IOS MPLS Virtual Private LAN Service, www.cisco.com/warp/public/cc/techno/ Jan. 1, 2004, p. 6pp, vol. mplsty/prodlit/, Numebervirp2_tb.pdf, Publisher: Cisco Systems, Inc., Published in: San Jose, California, US.

T. Li et al., Cisco Hot Standby Router Protocol (HSRP), www.ietf.org/rfc, Mar. 1, 1998, p. 17pp, vol. RFC, No. RFC2281, Publisher: Internet Engineering Task Force, Publishin in: Internet.

R. Hinden, Ed., Virtual Router Redundancy Protocol (VRRP), www.ietf.org/rfc, Apr. 1, 2004, p. 28pp, vol. RFC, No. RFC3768, Publisher: Internet Engineering Task Force, Published in: Internet.

Lasserre, M., et al., Virtual Private LAN Service (VPLS) Using Label Distribution Protocol (LOP) Signaling, www.ietf.org/rfc, Jan. 1, 2007, p. 31pp, vol. RFC, No. RFC4762, Publisher: Internet Engineering Task force, Published in: Internet.

Ali Sajassi, et al., "Routed VPLS Using BGP," Internet Working Group, Internet Draft, Mar. 23, 2010, 18 pages; http://tools.ietf.org/html/draft-sajassi-l2vpn-rvpls-bgp-00.

USPTO Oct. 15, 2012 Non-Final Office Action from U.S. Appl. No. 13/069,249.

USPTO Jan. 15, 2013 Response to Oct. 15, 2012 Non-Final Office Action from U.S. Appl. No. 13/069,249.

USPTO Mar. 4, 2013 Final Office Action from U.S. Appl. No. 13/069,249.

USPTO Jun. 4, 2013 RCE Response to Mar. 4, 2013 Final Office Action from U.S. Appl. No. 13/069,249.

* cited by examiner

PREVENTION OF LOOPING AND DUPLICATE FRAME DELIVERY IN A NETWORK ENVIRONMENT

RELATED APPLICATION

This Application is a continuation (and claims the benefit of priority under 35U.S.C. §120) of copending U.S. application Ser. No. 13/069,249, filed Mar. 22, 2011, entitled "PREVENTION OF LOOPING AND DUPLICATE FRAME DELIVERY IN A NETWORK ENVIRONMENT," Inventor(s) Ali Sajassi, et al. The disclosure of the prior Application is considered part of (and is incorporated by reference in) the disclosure of this Application.

TECHNICAL FILED

This disclosure relates in general to the field of communications and, more particularly, to preventing looping and duplicate frame delivery in a network environment.

BACKGROUND

Networking architectures have grown increasingly complex in modern communication environments. As the subscriber base of end users increases, proper routing and efficient management of communication sessions and data flows becomes critical. Internet Protocol (IP) communications generally provide different types of communication methods across a network (e.g., unicast and multicast). Unicast is a method of point-to-point communication, and it is typically used when two nodes need to exchange data, where neither node is concerned with sharing the data with multiple hosts. Multicast communications can allow a group of hosts to receive messages without broadcasting those messages to all of the hosts in the broadcast domain. In other instances, multicast communications can "flood" the broadcast domain, forwarding the messages to each node in the domain. A customer network or a customer device can be multi-homed to a provider network to help increase the reliability of the customer's connection to the provider network as well as other devices and networks connected through the provider network. Multi-homing can eliminate the possibility of a single point of failure (SPOF) for a network. A number of multi-homing techniques exist, including single link multiple IP address multi-homing, multiple interface multi-homing, multiple link single IP address multi-homing, and multiple link-multiple IP address multi-homing, as examples.

BRIEF DESCRIPTION OF THE DRAWINGS

Like reference numbers and designations in the various drawings indicate like elements.

DETAILED DESCRIPTION OF EXAMPLE EMBODIMENTS

Overview

Figure 1:
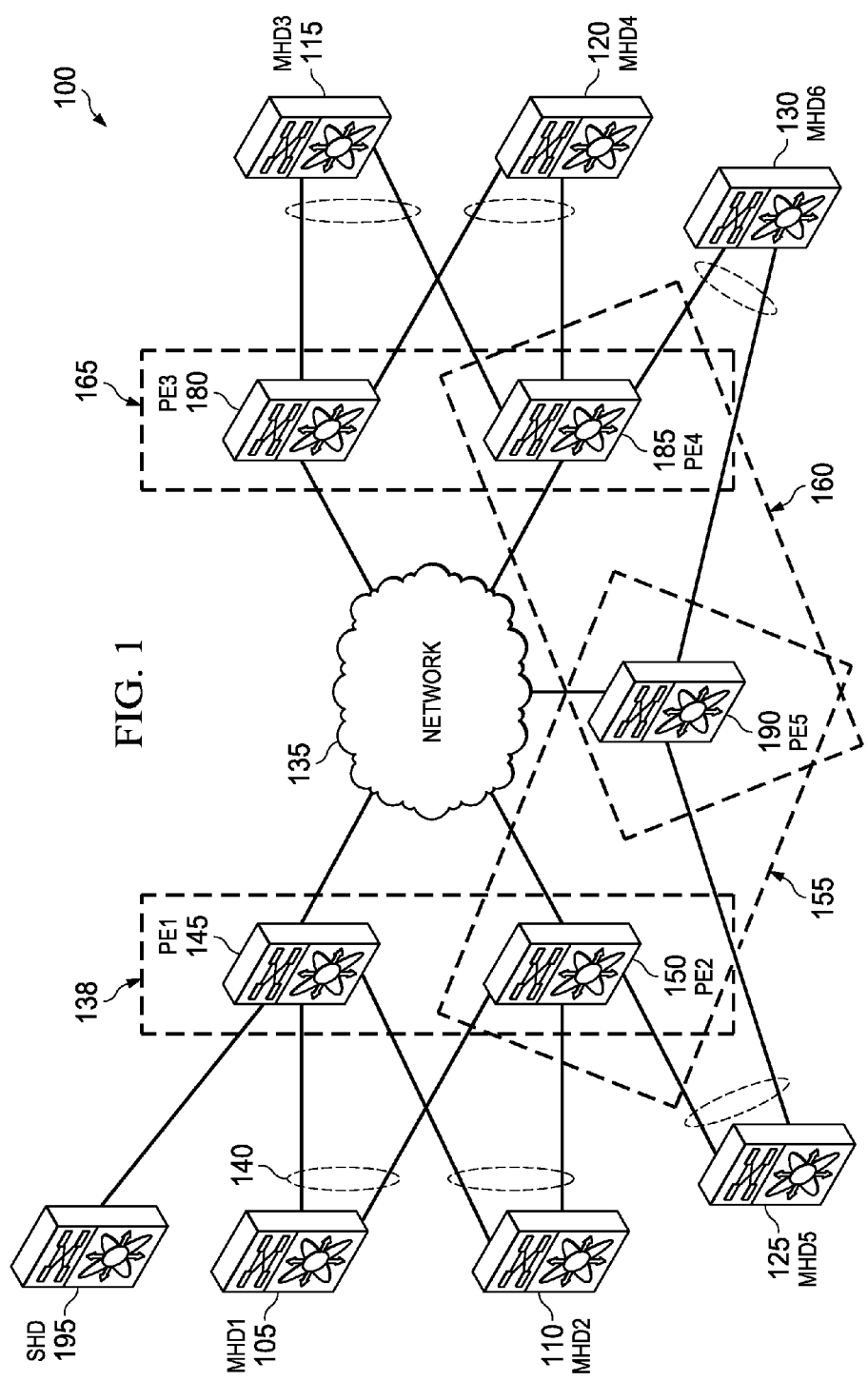
FIG. 1 is a simplified block diagram of a communication system including at least one multi-homed device.

In general, one aspect of the subject matter described in this specification can be embodied in methods that include the actions of receiving, at a particular edge node of a network including a plurality of network elements, a first multicast data packet forwarded from another network element in the plurality of network elements, the first multicast data packet including data received from a particular device interfacing with the network through a first edge node included in the plurality of network elements. The first multicast data packet can be multicast to the plurality of network elements by the first edge node. The particular edge node can be included in a first redundancy group including a first set of edge nodes included in the plurality of network elements, the first set of edge nodes including at least one other edge node in addition to the particular edge node.

The first multicast data packet can be examined to identify a first hint corresponding to the particular device. The particular device can be identified from the first hint. In response to identifying the particular device from the first hint, it can be determined that the particular edge node does not interface with the particular device. It can be further determined that the particular edge node is designated as a forwarding node for the first redundancy group. The first multicast data packet can be forwarded, using the particular edge node, based at least in part on the determination that the particular edge node is designated as a forwarding node for the first redundancy group. Other embodiments of this aspect include corresponding systems, apparatus, and computer programs, configured to perform the actions of the methods, encoded on computer storage devices.

These and other embodiments can each optionally include one or more of the following features. The particular edge node can be determined to be designated as a forwarding node for the first redundancy group in response to the determination that the particular edge node does not interface with the particular device. A first device can interface with the network via the first redundancy group. The first multicast data packet can be forwarded to the first device. The first redundancy group can provide active/active multi-homing of the first device to the network. The particular edge node can also be included in a second redundancy group including a second set of edge nodes included in the plurality of network elements, wherein a second device interfaces with the network via the second redundancy group. The particular edge node can also be included in a second redundancy group including a second set of edge nodes included in the plurality of network elements, the second set of edge nodes being different from the first set of edge nodes. The multicast data packet can be flooded to the plurality of network elements. The first hint can be added to the first multicast packet by the first edge node. The first hint can be included in an MPLS label of the first multicast data packet. The particular device can be identified from the first hint includes using the hint to identify a MAC address of the particular device. The particular edge node can include a processor and a memory storing data including a data record mapping the first hint to the particular device. The stored data can identify the designated forwarding node for the first redundancy group. The data record can further include a mapping of at least one other hint to at least one device corresponding to the hint.

A second multicast data packet can be received at the particular edge node forwarded from another network element in the plurality of network elements. The second multicast data packet can be examined to identify a second hint corresponding to the second device. The second device can be identified from the second hint. It can be determined that the particular edge node interfaces with the second device in response to identifying the second device from the second hint. It can be determined that data in the second multicast data packet originated from the second device and that the second multicast data packet should not be forwarded to the second device based, at least in part, on the determination that the particular edge node interfaces with the second device. Another edge node in the second set of edge nodes, designated as the forwarding node for the second redundancy group, can forward the second multicast data packet. In another alternative, it can be determined that the particular edge node does not interface with the second device in response to identifying the second device from the second hint. Accordingly, it can be determined that the particular edge node is not designated as a forwarding node for the second redundancy group, and that the particular edge node should not forward the second multicast data packet based, at least in part, on the determination that the particular edge node is not designated as a forwarding node for the second redundancy group.

In another general aspect, a first control plane message can be received from a first edge node in a plurality of edge nodes included in a plurality of network elements of a network, the first control plane message identifying a first hint to be included in first multicast packets that include data originating from a first computing device interfaced with the first edge node and are forwarded to the network through the first edge node. A data record can be stored in a memory device, the data record identifying the association between the first hint and the first computing device. The data record can be used to determine that multicast packets received that include the first hint originate from the first computing device and are not to be forwarded to the first computing device by edge nodes, in the plurality of edge nodes, interfacing with the first computing device. Other embodiments of this aspect include corresponding systems, apparatus, and computer programs, configured to perform the actions of the methods, encoded on computer storage devices.

These and other embodiments can each optionally include one or more of the following features. An indication that the first edge node interfaces with the first computing device can also be stored. The data record can be used to determine that received multicast packets including the first hint should not be forwarded to the first computing device in order to avoid looping of the received multicast packets. The first computing device can be a customer-side edge network device. The data record can be updated to identify the association between the particular hint and the particular computing device. The second control plane message can be received by the second edge node device. The first control plane message can include information identifying how the first hint is to be included in the first multicast packets and the information is included in the data record identifying the association between the first hint and the first edge node. The information can further identify that the first hint is to be included in MPLS labels of the first multicast data packets. The first hint can identify a MAC address of the first computing device. The data record can be shared by at least two edge nodes in the plurality of edge nodes.

Additionally, the first edge node can be included in a redundancy group including a first set of edge nodes included in the plurality of network edge nodes, each node in the first set of edge nodes interfacing with the first computing device, and the first set of edge nodes including at least other edge node in addition to the first edge node. A second control message can be received that identifies that the first edge node is a designated forwarder for the redundancy group. A data record can be stored in a memory device, the data record identifying that the first edge node is a designated forwarder for the redundancy group. The second control plane message can be directed to edge nodes in the first set of edge nodes.

Further, a particular computing device interfaced with a second edge node device can be identified. A particular hint can be generated corresponding to the particular computing device, the particular hint for inclusion in multicast packets that include data originating from the particular computing device and are forwarded to other edge nodes in the plurality of edge nodes. A second control message can be sent to other edge nodes in the plurality of edge nodes advertising that the second edge node device interfaces with the particular computing device and that the particular hint corresponds to the particular computing device.

Particular embodiments of the subject matter described in this specification can be implemented so as to realize one or more of the following advantages, as well as other advantages. For instance, the subject matter described herein can be applied to provide increased connection reliability through an all-active network redundancy solution, allow convenient scaling of network redundancy solutions, simplify providers' network operations, lower network service provider capital and operational expenditures, among other advantages.

EXAMPLE EMBODIMENTS

In some instances, flexible all-active multi-homing within a communication system, such as a VPLS system, can be desired, as it can provide a reliable network redundancy solution to customers while at the same time allowing for convenient scaling and increased provider flexibility that can simplify network operations and lower both capital as well as operational expenditures, among other advantages. All-active multi-homing, however, can introduce undesirable frame looping and duplicate frame delivery however, particularly in multicast forwarding of frames to multi-homed devices. To mitigate against looping and duplicate frame delivery, provider edge (PE) nodes, before forwarding frames into the network core, can tag frames, received from customer edge nodes, with hint data that can be used by other provider edge nodes (in a VPLS instance, for example) to identify the original source (or customer edge node) from which the packets originate. Accordingly, PE nodes can identify, from the hint data, if they would be forwarding a multicast frame back to its source, thereby avoid the creation of a loop. Further, multi-home redundancy groupings of PE nodes (or redundancy groups (RG)) can designate a forwarder for multi-cast traffic within the redundancy grouping to mitigate against multiple PE nodes, connected to a common CE node, forwarding duplicates of the same frame to the common CE node. Other features, solutions, details, implementations, and alternatives will be appreciated based on the below.

FIG. 1 is a simplified block diagram of a communication system 100 including at least one multi-homed device. For instance, a multi-homed device (e.g., 105, 110, 115, 120, 125, 130) can be coupled to one or more network edge devices, such as routers, routing switches, integrated access devices (IADs), multiplexers, and other network access devices to provide access to a network 135, such as a provider MPLS network. In some instances, a single multi-homed device (e.g., 105) can be coupled to a virtual edge node 138 via multi-chassis link aggregation group (MCLAG) 140 including a plurality of link-aggregated network edge devices (e.g., 145, 150), thereby providing a redundant connection to a network 135. Multiple virtual nodes (138, 155, 160, 165) can also be provided for a particular network 135 using a plurality of network edge devices (e.g., 145, 150, 180, 185, 190). As shown in FIG. 1, in some instances, a single edge device (e.g., 150) can be included in multiple virtual nodes (e.g., 138 and 155, coupling the network 135 to multi-homed devices 105 and 125 respectively). Multiple multi-homed devices 105, 110, 115, 120, 125, 130 can be coupled to the network 135 via virtual redundancy group nodes employing multiple network edge devices (e.g., 145, 150, 180, 185, 190). In other instances, devices (e.g., 195) can also be included that are coupled to the network 135 via a single network edge device (e.g., 145). Indeed, a particular network edge device (e.g., 145) can be used to couple devices (105, 110, 195) via a virtual redundancy group node (e.g., 138) or in a single-homed configuration (e.g., for 195).

In some instances, communication system 100 can be associated with a service provider network deployment. For instance, communication system 100 can be associated with a digital subscriber line (DSL) deployment. In other examples, communication system 100 can be used in connection with other additional or alternate communication environments, such as an enterprise wide area network (WAN) deployment, cable scenarios, broadband generally, fixed wireless instances, fiber to the x (FTTx), which is a generic term for any broadband network architecture that uses optical fiber in last-mile architectures. Communication system 100 may include a configuration capable of transmission control protocol/internet protocol (TCP/IP) communications for the transmission and/or reception of packets in a network. Communication system 100 can also operate in conjunction with a user datagram protocol/IP (UDP/IP) or any other suitable protocol, where appropriate and based on particular needs.

While virtual private local area network (LAN) services (VPLS) are widely deployed in modern systems, challenges continue to exist pertaining to redundancy and multicast optimization. For instance, redundancy optimization in typical VPLS systems can often be limited to multi-homing using active/standby resiliency models. Flexible multi-homing with all-active attachment circuits (ACs) cannot be supported using traditional VPLS solutions without adding considerable complexity to the VPLS data-path. In an all-active (or "active-active") multi-homing instance, all PE nodes connected to the multi-homed CE device actively forward unicast traffic to/from the CE device for the same service instance. In active-standby multi-homing, only one PE node in the redundancy group is forwarding traffic, whereas the other PE nodes are in stand-by. Among its advantages, active-active multi-homing can allow for load-balancing of traffic among the multiple PE nodes of a redundancy group. Further, traditional VPLS multicast optimization is often limited to point-to-multipoint (P2MP) multicast distribution trees (MDTs), as it can be difficult to leverage multi-point to multi-point (MP2MP) MDTs with VPLS. This typical lack of MP2MP support creates scalability issues for certain applications.

In some instances, all-active multi-homing and/or MP2MP MDT support can impose a number of requirements on a system. For instance, flow-based load balancing can be required. Existing load-balancing algorithms can involve selecting an outbound link within a bundle based on a hash function that identifies a flow based on one or more of the following fields: i) Layer 2: Source MAC Address, Destination MAC Address, VLAN; ii) Layer 3: Source IP Address, Destination IP Address; iii) Layer 4: UDP or TCP Source Port, Destination Port; or iv) combinations thereof. A bundle can operate correctly even in the presence of asymmetric load-balancing over the links. As a result, active/active VPLS dual-homing can require the ability to accommodate flexible flow-based load-balancing from the customer edge (CE) node based on L2, L3 and/or L4 header fields. Active/active VPLS dual-homing solutions can further require that provider edge (PE) nodes be able to exploit equal-cost multi-paths (ECMPs) in the MPLS core network by identifying traffic flows within a pseudowire (PW), and associating these flows with a Flow Label. The flows can be classified based on any arbitrary combination of L2, L3 and/or L4 headers.

PE nodes that offer dual-homed connectivity (e.g., via a redundancy grouping of PE nodes) to a CE node or access network can be situated in the same physical location (co-located), or may be distributed geographically (e.g., among different points of presence (POPs)). In some instance, distributing PE nodes geographically can offer a geo-redundant solution that can preserve business continuity for critical applications in the event of power outages, natural disasters, etc. In some instances, an active/active VPLS dual-homing mechanism should support both co-located as well as geo-redundant PE node placement. Further, active/active VPLS dual-homing mechanism may need to support optimal forwarding of unicast traffic for all the following scenarios: i) single-homed CE to single-homed CE; ii) single-homed CE to dual-homed CE; iii) dual-homed CE to single-homed CE node; and iv) dual-homed CE to dual-homed CE, as both single-homed as well as dual-homed CEs can be connected to a single PE node.

In order to simplify service provisioning and activation, a VPLS dual-homing solution can be required to allow arbitrary, or flexible, grouping of PE nodes into redundancy groups. Flexible multi-home redundancy groupings can simplify network operations and lower both capital as well as operational expenditures, by allowing PE nodes to be interchanged and shared between redundancy groups. PE nodes can offer flexible multi-homed grouping because they belong to more than a single redundancy group with few or no restrictions or limitations.

Figure 2A:
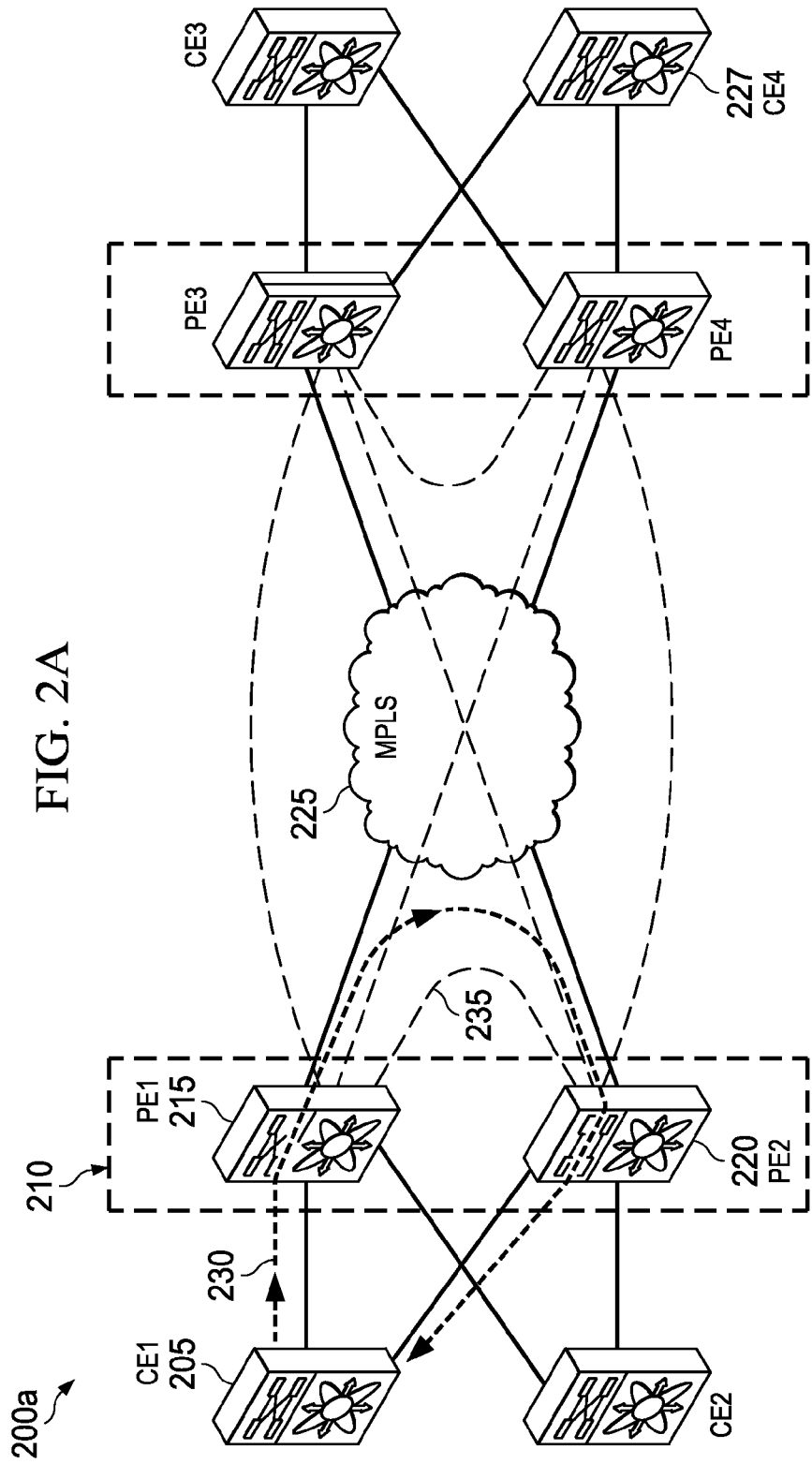
FIG. 2A is a simplified block diagram illustrating looping within an example communication system employing multi-homing.

Supporting active/active (or all-active) multi-homing of an Ethernet network, or other dual-homed network (DHN), to a pair of VPLS PE nodes can pose a number of challenges including the formation of forwarding loops, duplicate delivery of flooded frames, and MAC Forwarding Table instability. FIG. 2A illustrates an example of a forwarding loop 230 within a traditional communication network 200a including at least one multi-homed customer edge node (e.g., 205). The customer edge node 205, in this example, is multi-homed to a redundancy group 210 including PE nodes 215 and 220 in order to access core network 225, such as an MPLS core. A packet 230 is sent from the customer edge node 205 to a first PE node 215 in redundancy group 210 ultimately destined for another node, such as another CE node 227 on the other side of the network 200a. For purposes of illustration, it is assumed that the first PE node 215 does not have a forwarding entry in its MAC address table for CE 227. Accordingly, the first PE node 215 will flood the frame 230 to all other PEs in the VPLS instance (e.g., PE2, PE3, PE4) using, for example, ingress replication over the full-mesh of pseudowires (e.g., 235), or over a Label-Switched Multicast (LSM) tree, etc. In the example of FIG. 2A, when PE2 220 receives the flooded traffic, assuming it also does not know the destination port to CE 227, it will further flood the traffic over the ACs for the virtual forwarding instance (VFI) communicatively coupled to PE1 215, including the AC of CE node 205. Hence, a forwarding loop is created where CE1 205 receives its own traffic.

Figure 2B:
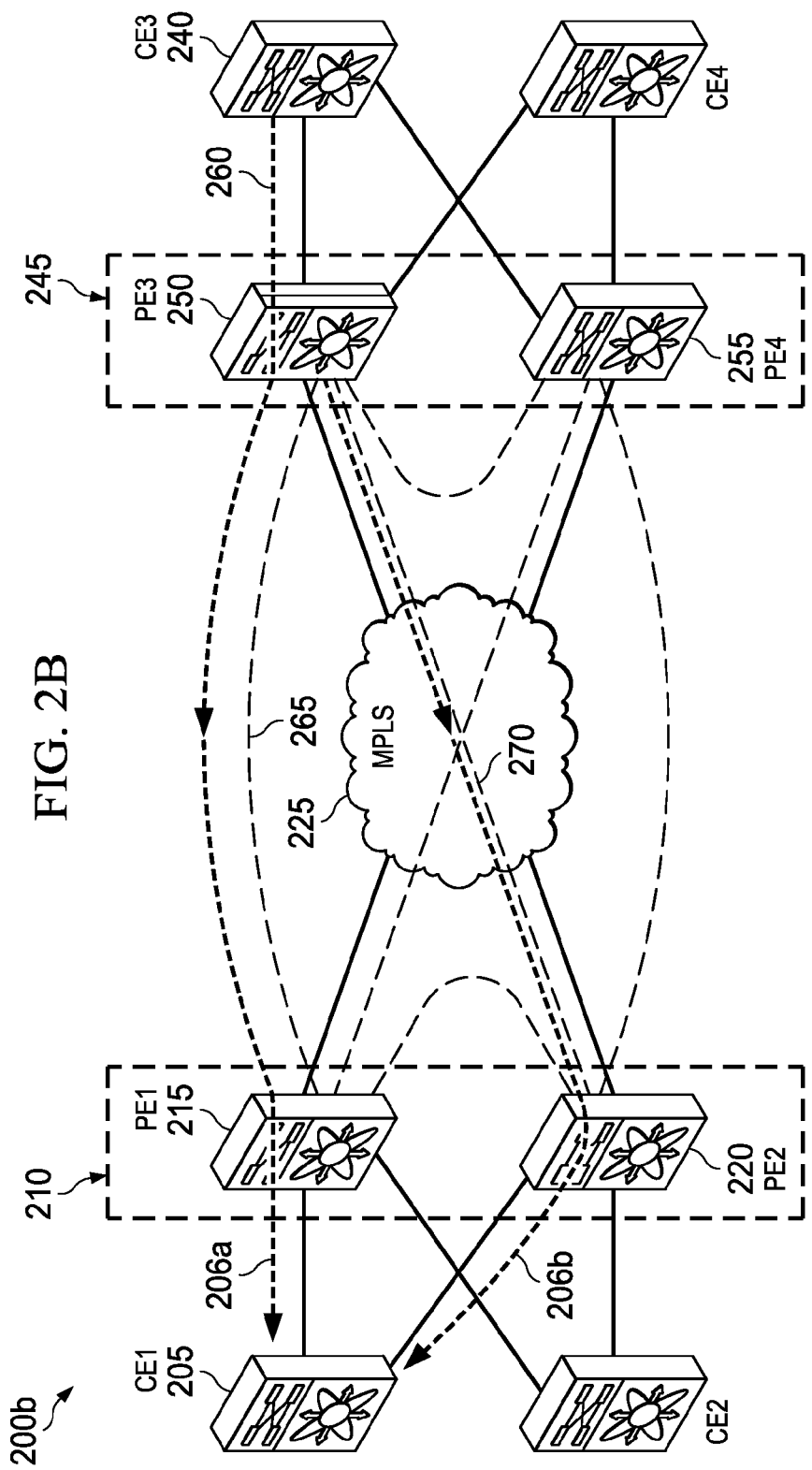
FIG. 2B is a simplified block diagram illustrating duplicate frame delivery within an example communication system employing multi-homing.

Additional issues can surface when forwarding a multi-destination frame within and over a traditional VPLS (e.g., unknown unicast, broadcast or multicast frames). Turning to the example 200b of FIG. 2B, a CE node 240, connected to redundancy group 245 including PE nodes 250 and 255, sends traffic 260 destined for another CE node 205 over PE3 250 to MPLS core 225. In this example, PE3 250 floods the frame 260 to both PE1 215 and PE2 220 of redundancy group 210, using, for example, ingress replication over the pseudowire full-mesh or an LSM tree. Both PE1 215 and PE2 220 will accordingly receive copies 260a, 260b of the frame 260, over pseudowires 265, 270 respectively. PE1 215 and PE2 220 will both then forward the traffic on to CE1 205, resulting in CE1 205 receiving duplicate frames (i.e., 260a, 260b).

Further, in some instances, traditional VPLS systems can result in MAC table instability. For instance, assume that both PE1 and PE2 have learned that CE3 is reachable via PE3. Accordingly, CE1 can send unicast traffic to CE3. In instances where CE1 has its ACs configured in a link aggregation group, it can forward traffic over both ACs using some load-balancing technique. Further, both PE1 and PE2 will forward frames from CE1 to PE3. Consequently, it is possible that PE3 will see the same MAC address for CE1 constantly moving between its pseudowire to PE1 and its pseudowire to PE2. Consequently, the MAC table entry for CE1 will keep flip-flopping indefinitely depending on traffic patterns. This MAC table instability on PE3 can lead to frame mis-ordering for traffic going from CE3 back to CE1.

In accordance with one example implementation, communication system 100 can resolve one or more of the aforementioned issues associated with multicast communication involving PE nodes flexibly multi-homed to CE nodes in the system 100. More specifically, multicast packets, such as flooded traffic, forwarded by a particular PE node included in a particular redundancy group, can be tagged with data, such as a hint or identifier, providing context that can be used by PE nodes within a particular VPLS instance to identify the CE node, or AC, from which the multicast packets originate. A PE node can thereby examine traffic received from other nodes to determine whether the traffic was introduced to the VPLS from a multi-homed CE node in order to avoid looping traffic back to the originating CE node. Further, a designated forwarding node can be defined, for each redundancy group, the forwarding node responsible for forwarding multi-destination frames received from the core network, such as an MPLS core, to a particular multi-homed device. A PE node can check to see if it has been designated as the forwarding node for particular traffic to a particular multi-homed CE node, and in the event that it is not the designated forwarding node, filter traffic so that duplicate frames are not forwarded to the multi-homed CE node by PE nodes in the redundancy group communicatively coupled with the multi-homed CE node.

Further, a VPLS can include control-plane-based MAC learning over the MPLS core. PE nodes can continue to perform data-plane-based learning over their respective ACs, but can restrict learning on traffic received from the MPLS core. MAC addresses learned by a PE node over its respective ACs can be advertised, for instance, using BGP to all other PE nodes in the same VPLS instance. PE nodes remote from the advertising PE node can receive these BGP network layer reachability information (NLRI) advertisements and install forwarding entries, for the corresponding MAC addresses, in their VFIs pointing to the PE node sending the advertisements. Multicast/broadcast traffic can be forwarded, for example, using a VPLS pseudowire full-mesh, or over an LSM tree. Further, the MAC advertisements can further include, in some instances, corresponding hint data as well as instructions for interpreting the hint data so that PE nodes can identify, from frames tagged with such hints, that the frames originate from a particular CE node. Further, control plane transactions can take place between PE nodes assigning and maintaining assignments for designating forwarding nodes within a redundancy groups for forwarding traffic to multi-homed CE nodes coupled to the redundancy group.

Figure 3:
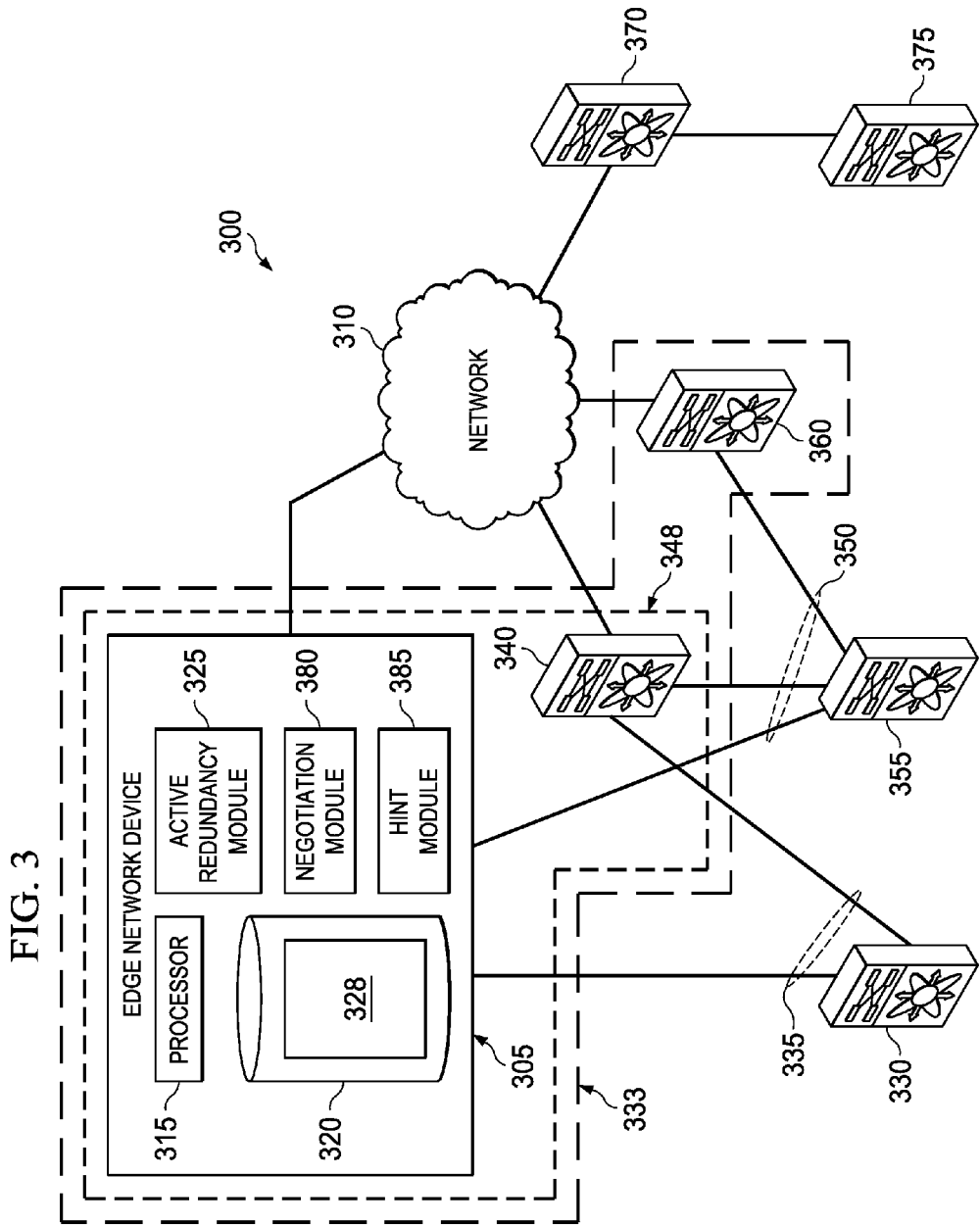
FIG. 3 is a simplified block diagram of a portion of a communication system coupling a plurality of multi-homed devices to a provider network.

Turning to FIG. 3, a simplified block diagram is shown illustrating one possible set of details associated with communication systems, such as communication system 100 illustrated in FIG. 1. At least a portion of a VPLS communication system 300 is shown including provider edge node devices 305, 340, 360, 370 providing various customer edge devices or circuits 330, 355, 375 access to a core network 310. Some of the CE devices (e.g., 330, 355) can be multi-homed to redundancy groups 333, 348, via MCLAGs 335 and 350 respectively, each redundancy group 333, 348 including a plurality of PE devices. Indeed, a single PE device, or node, can belong to multiple different redundancy groups. In this particular example, for instance, PE device 305 is included in a first redundancy group 333 with PE device 340 providing CE device 330 with access to core network 310. PE device 305 further belongs to another redundancy group 333 that includes PE devices 340 and 360, providing network 310 access to yet another CE node 355.

PE device 305 can include at least one processing device 315 and memory 320. Additionally, an active redundancy module 325 can be executed by or in connection with PE device 305 to perform tasks related to the prevention of looping and duplicate frames by the PE device 305 in connection with its association with a particular redundancy group (e.g., 333, 348). For instance, active redundancy module 325 can access and consult a data record 328, such as a database, including an identification of CE nodes (and/or corresponding ACs) accessing the network 310 through PE device 305. In some instances, data record 328 can include hint data for these CE nodes, as well as other CE nodes within the VPLS instance 300. Active redundancy module 325 can be used to examine frame headers for such hint data and identify the source CE node from the hint data in order to determine whether the PE device 305 would be forwarding a frame back to its original source CE node, thereby creating an unacceptable loop.

In addition to hint data, data structure 328 can include data records and tables identifying forwarding node designations for various redundancy groups, including redundancy groups to which the PE device 305 belongs. Further, active redundancy module 325 can include functionality for identifying, from data structure 328, whether the PE device 305 is the designated forwarder of multi-cast traffic from the core network 310 to a particular AC or CE node. As an example, in redundancy group 348, including PE devices 305 and 340 interfacing with dual-home CE device 330, PE device 340 has been designated as the forwarding node for multi-cast traffic to CE device 330 from redundancy group 348. This designation can be defined in data structure 328. Accordingly, active redundancy module 325 can identify, from multi-cast traffic received by PE devices 305 and 340 in redundancy group 348, that PE device is not the designated forwarder for such traffic to CE node 330. As a result, active redundancy module 325 can be used, in some examples, to filter egress traffic so that multi-cast traffic received from the core network 310 by PE node 305 is not forwarded to CE nodes for which it is not the designated forwarder. On the other hand, corresponding functionality included, or used in connection with, PE device 340 can identify that PE device 340 is the designated forwarder for the multi-cast traffic to CE node 330 allowing the traffic to egress PE device 340 for forwarding to CE node 330. In this manner, the forwarding of duplicate frames by PE devices multi-homed to a particular CE node 330 can be avoided.

While data structure 328 is shown, in the particular exemplary implementation illustrated in FIG. 3, as being maintained locally as a single structure or database by the individual PE devices (e.g., 305), all or a portion of the data structure can be centralized for access by multiple, different PE devices (e.g., 340, 360) also equipped with functionality, similar to active redundancy module 325, for mitigating against traffic looping and duplicate frame forwarding. In instances where at least a portion of data structure 328 is maintained by a particular PE device, data structure can include a complete or less than complete record identifying the CE nodes known to the system 300 and the corresponding PE nodes through which the CE nodes access the network 310. Further, for forwarding node designations maintained in data structure(s) 328, forwarding node designations can be maintained system-wide, for all PE nodes in the VPLS 300, for each PE node (e.g., based on the redundancy groups to which the PE node belongs), or, alternatively, for each redundancy group as a grouping of PE nodes. Moreover, one or more PE nodes can dynamically build, update, or write to the data structure 328, using for instance, a negotiation module 380 configured to read, send, and exchange control plane messages with other PE nodes to advertise membership in particular redundancy groups, interfaces with various CE nodes, designation as a forwarding node for a particular redundancy group, etc. Further, negotiation module 380 can also be used to exchange control plane messages to elect a designated forwarding node among a set of PE nodes included in a particular redundancy group, among other features.

In addition to receiving and interpreting frames from other nodes, a PE device 305 can also send and forward frames originating from certain CE nodes (e.g., 330, 355). In some implementations, PE device 305 can also include a hint generation module 385 adapted to tag, insert, append, or otherwise insert hint data into packets received from a particular CE node for forwarding through network 310. Using hint generation module 385, the PE device 305 can determine the identity of the CE node from which the frame originates and generate hint data for use with traffic received from the CE node for forwarding by the PE device 305. Generation of hint data for a newly discovered CE node, for instance, can prompt control plane messaging (e.g., using negotiation module 380) advertising the relationship between PE device and the newly discovered CE node, as well as the corresponding, generated hint data, to other PE devices (e.g., 340, 360, 370). Further, hint generation module 385 can be used, in some examples, to append, insert, tag, or otherwise include the generated hint in frames received from the corresponding CE device for forwarding into the network 310. Indeed, in some examples, the hint generation module 385 can identify that particular traffic received by the PE device 305 originates from an interfacing CE device (e.g., 330, 355) and further identify a corresponding hint to be appended to the received traffic prior to forwarding into network 310. For instance, hint generation module 385, upon identifying the CE source node, can consult a data record (e.g., 328) to identify the hint data corresponding to the CE source node. This hint data can then be appended to the traffic (e.g., in an MPLS header, etc.), as forwarded by the PE device 305.

Figure 4A:
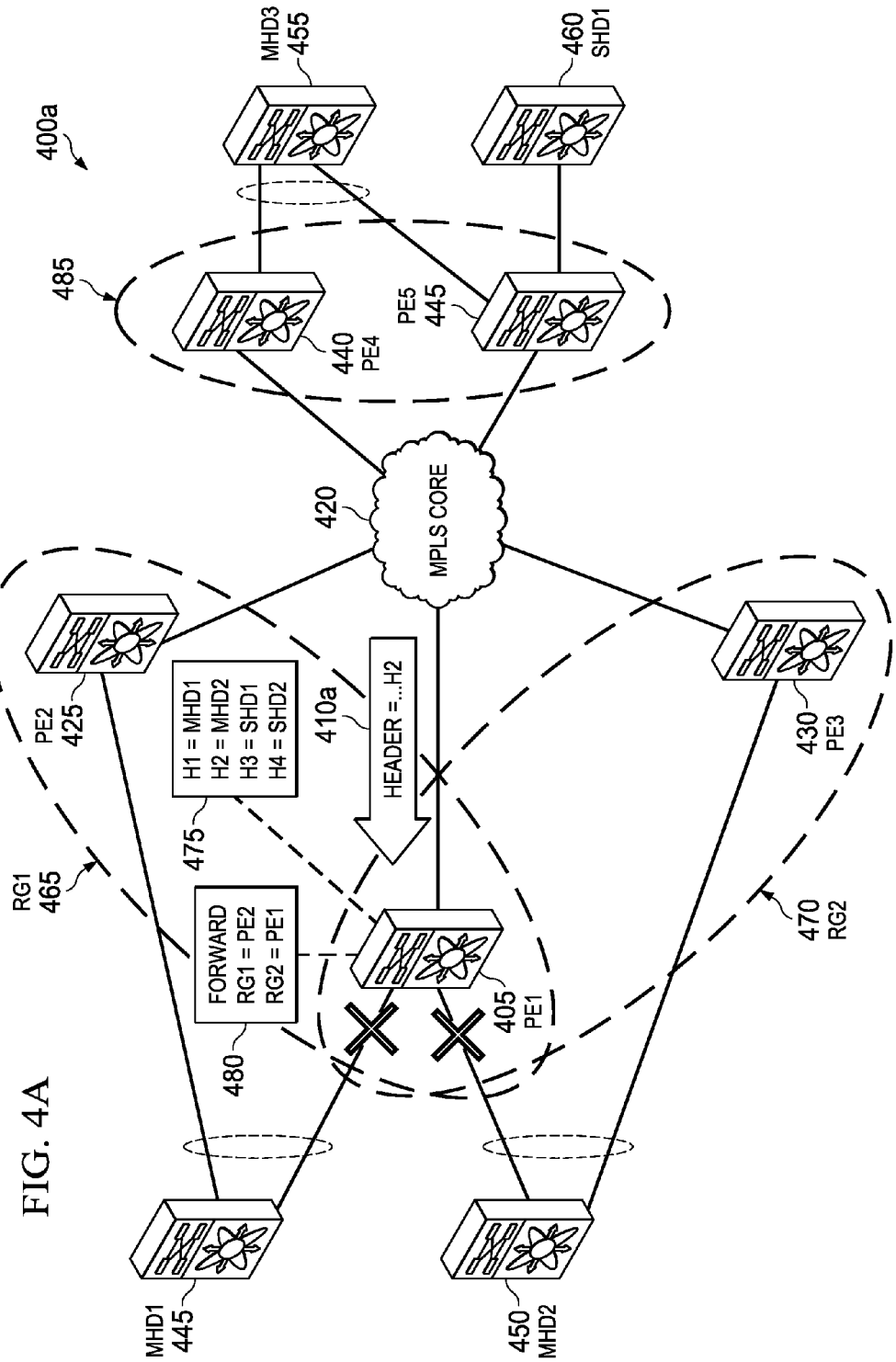
FIG. 4A is a simplified block diagram illustrating a first example instance of preventing looping and duplicate frame delivery in a communication system including at least one multi-homed device.
Figure 4B:
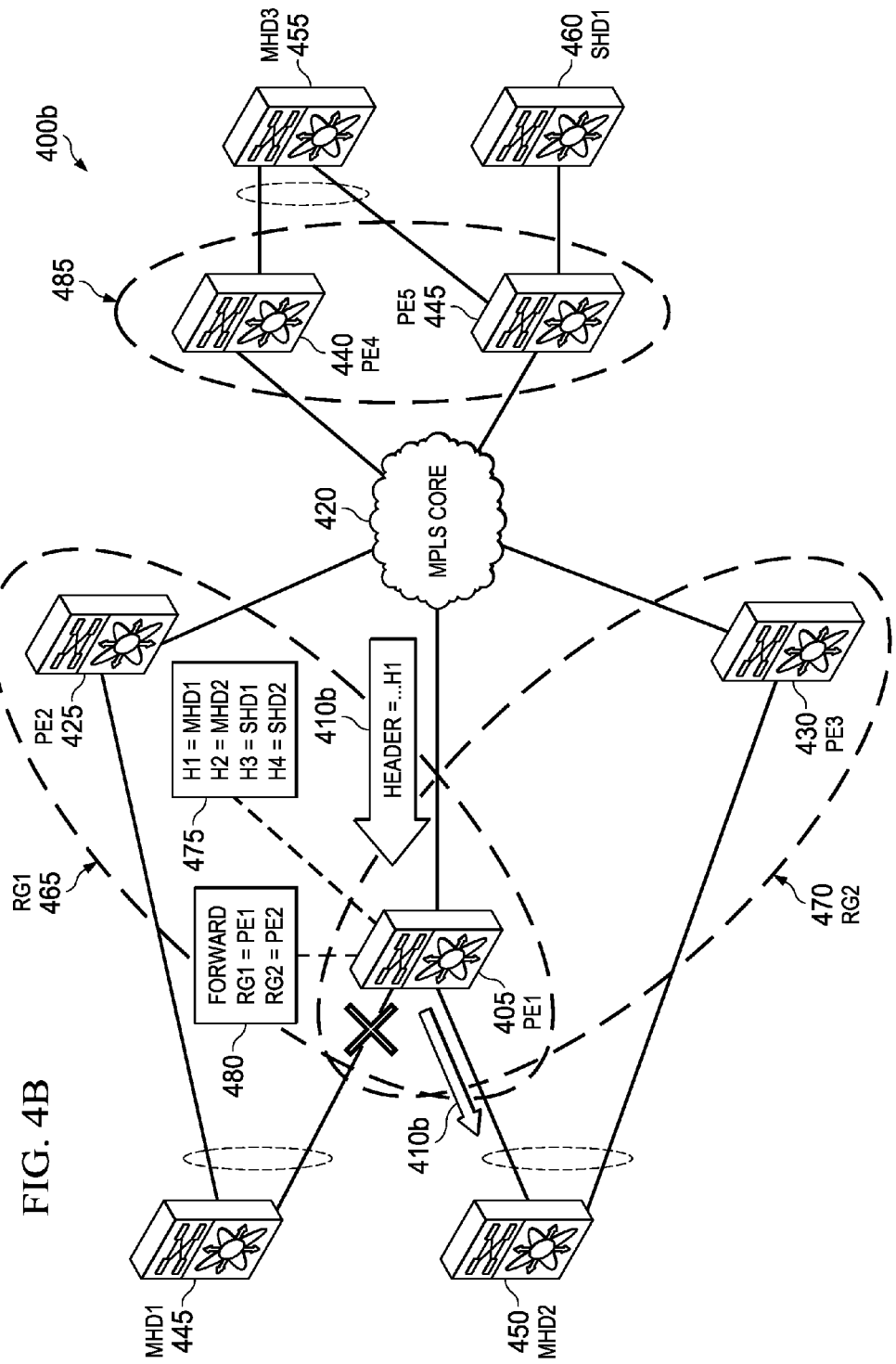
FIG. 4B is a simplified block diagram illustrating a second example instance of preventing looping and duplicate frame delivery in a communication system including at least one multi-homed device.
Figure 4C:
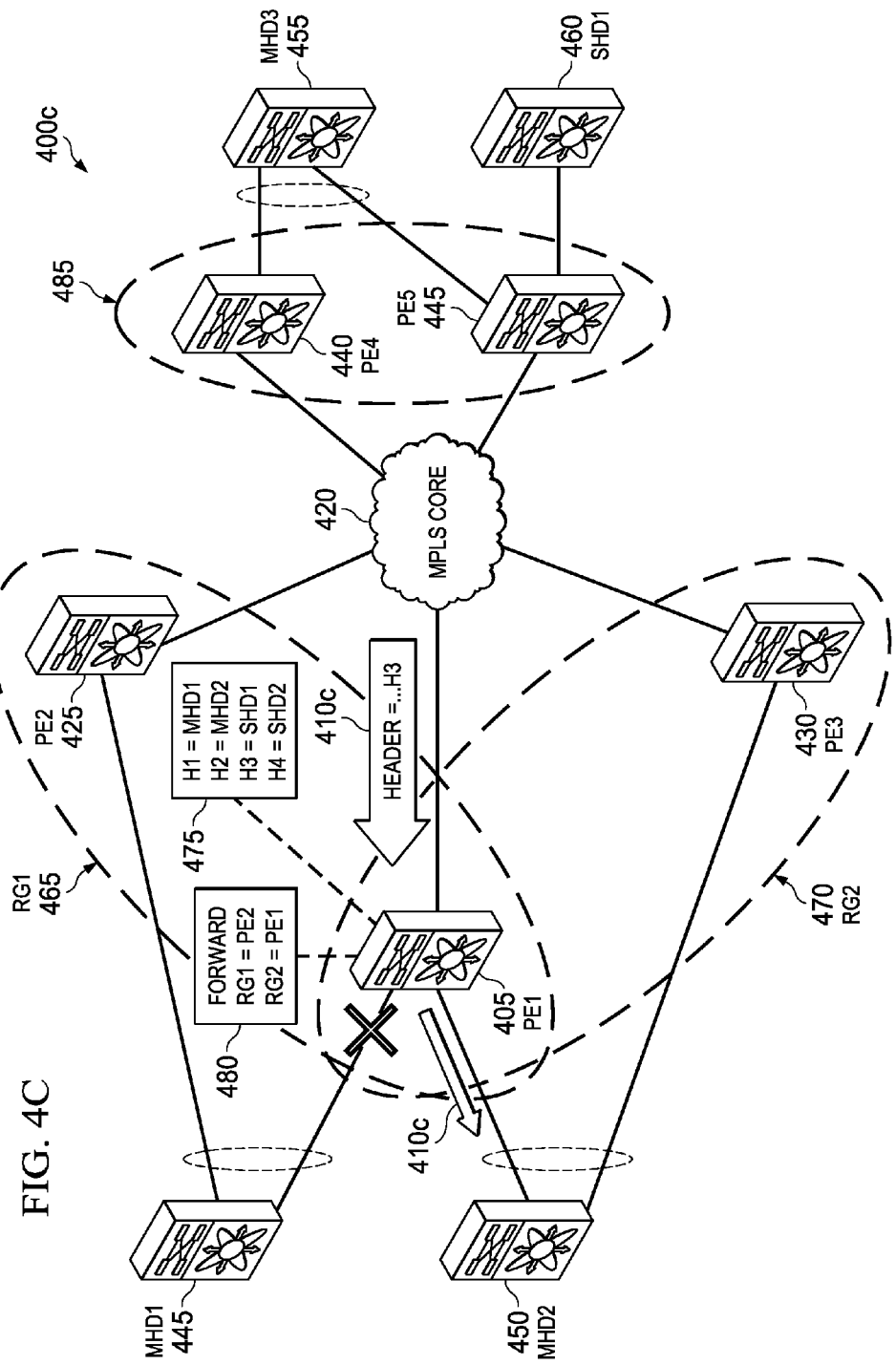
FIG. 4C is a simplified block diagram illustrating a third example instance of preventing looping and duplicate frame delivery in a communication system including at least one multi-homed device.

Turning to FIGS. 4A-4C, simplified block diagrams 400a-c are shown illustrating some potential operations associated with the present disclosure. In the implementation of FIG. 4A, a network edge device PE1 (405), such as a router, receives a frame 410a. The frame 410a can be a multi-cast frame, such as a frame flooding an MPLS core 420, and forwarded by one or more other network edge devices (or PE devices) (e.g., 425, 430, 445, 440) to customer edge (CE) devices 445, 450, 455, 460 accessing the core 135 via the PE nodes (e.g., PE1, PE2, PE3, PE4, PE5). As but one example, the flooded frame 410a could be an address resolution protocol (ARP) message broadcast throughout the system illustrated in diagram 400a. Frame 410 can include various headers used by network devices to route the frame to one or more other devices, such as CE devices 445, 450, 455, 460.

As described above, in addition to traditional header and payload data included in frame 410a, frame 410a can further include hint data that can be used by PE devices included in a redundancy group (e.g., 465, 470, 485) to multi-home certain CE devices (e.g., 445, 450, 455). In the example of FIG. 4A, frame 410a can include hint data with a value of "H2." PE1 device 405 can read the frame 410a to identify the hint data. Upon recognizing that the hint data value is "H2" for the frame 410a, the PE1 device 405 can consult a data record 475 to determine the origin of frames including particular hint values. In this example, PE1 device 405 identifies from data structure 475 that frames including hint data with a value "H2" were forwarded to PE nodes of the MPLS core 420 by a multi-homed CE device MHD2 (450). PE1 device can further identify, such as in data structure 475, or another data structure, that PE1 is connected to, or otherwise interfaces with, CE device MHD2 450. As a result, were PE1 to flood nodes adjacent to it, it would inadvertently forward frame 410a to CE device MHD2 450 creating a loop. Accordingly, upon identifying that PE1 is connected to the originating CE device (i.e., MHD2) of frame 410a, PE1 elects not to forward frame 410a to CE device MHD2 450.

While, in FIG. 4A, PE1 405 elects not to forward the traffic of frame 410a to CE device MHD2 450 in accordance with a loop-avoidance protocol, PE1 405 may nonetheless continue forwarding frame 410a to other adjacent nodes. For instance, PE1 405 could forward frame 410a to another adjacent CE node MHD1 (445) (as MHD1 445 was not the source of packet 410a). However, because CE device MHD1 445 is multi-homed to redundancy group RG1 465 including PE1 device 405, forwarding frame 410a to CE device MHD1 445 could result in duplicate traffic being delivered to CE device MHD1 445 if other PE devices in RG1 465 (e.g., PE2 425) also flood adjacent nodes with the frame 410a. Accordingly, after determining that frame 410a does not originate from CE device MHD1 445 (e.g., by again consulting data structure 475), PE1 405 can further consult a forwarding data structure 480 to determine which PE device in RG1 is responsible for forwarding particular multicast or flooded traffic to CE device MHD1 445. After consulting the forwarding data structure 480, the PE1 405 identifies that PE2 is the designated forwarding node of redundancy group RG1. Accordingly, PE1 405 also elects not to forward frame 410a to CE device MHD1 445 in order to avoid the sending of duplicate traffic to CE device MHD1 445.

FIG. 4B includes a simplified block diagrams 400b illustrating another potential operation associated with the present disclosure. For instance, in the example of FIG. 4B, a frame 410b is flooded to PE1 405 for forwarding to nodes adjacent to PE1, including multi-homed devices 445, 450 connected to 405 through redundancy groups RG1 (465) and RG2 (470) respectively. In the example of FIG. 4B, frame 410b includes hint data with a value equal to "H1." Accordingly, PE1 405 identifies that the frame 410b originated from corresponding CE device MHD1 445, and further identifies that PE1 405 provides MHD1 445 access to network 420. Accordingly, PE1 elects not to forward frame 410b to MHD1 445 to avoid creating a loop. Further, PE1 identifies that forwarding frame 410b to adjacent CE node MHD2 450 would not result in a forwarding loop. However, PE1 can recognize that MHD2 450 is multi-homed to PE1 through redundancy group RG2 470 and that the risk exists that duplicate copies of frame 410b will be forwarded to MHD2 450 by the plurality of nodes in redundancy group RG2 470. As a result, in order to avoid sending duplicate packets to MHD2 450, PE1 can look-up the designated forwarding node for RG2 in forwarding data structure 475 to determine that PE1 is, indeed, the designated forwarder of flooded (or other multicast) traffic for redundancy group RG2 and/or MHD2 450. Accordingly, in this example, PE1 determines that it can proceed with forwarding frame 410b to MHD2 450 but not to MHD1 445.

Turning to FIG. 4C, another multicast frame 410c is forwarded to PE1 405 for forwarding to nodes adjacent to PE1 405. In the example of FIG. 4C, frame 410c includes hint data with a value equal to "H3." Accordingly, PE1 405 parses the hint data and consults data structure 475 to determine that frame 401c originates from a CE node 455 that is not adjacent to PE1 405. As a result, PE1 405 can determine that no immediate risk of looping exists for forwarding on the traffic 410c to either CE node 445 or 450. However, before forwarding to either CE node 445, 450, PE1 405 consults forwarding data structure 480 to determine if and for which adjacent CE nodes PE1 405 is the designated forwarder. In this particular example, PE1 405 determines that it is the designated forwarder for traffic to CE device 450, but not CE device 445. Accordingly, PE1 405 forwards packet 410c to CE device 450 but not CE device 445, as PE2 is the designated forwarder for redundancy group RG2 470.

It should be appreciated that data structures 475, 480 illustrated in FIGS. 4A-4C, are simplified representations of data structures that could be populated and used by PE devices to avoid looping and duplicate frame delivery to multi-homed CE devices. As hundreds and thousands of PE nodes can exist for a particular network core, data structures (e.g., 475) tracking which PE nodes are connected as access point to which CE nodes can be quite complex and large. Indeed, data structure 475, in some instances can be combined with or otherwise included with forwarding data structure 480. Forwarding data structure 480 can also include features beyond those illustrated in the simplified representation illustrated in FIGS. 4A-4C. For instance, a forwarding table can include particular rules or conditions for which a particular PE node is the designated forwarding node for a redundancy group. For instance, a single redundancy group can be configured as a network access point for multiple CE nodes. Accordingly, a PE node in the single redundancy group can be the designated forwarding node for some CE nodes connected to the redundancy group and not for others. Accordingly, a forwarding data structure can designate the particular CE nodes for which a particular PE node is the designated forwarder. Further, a particular PE node within a redundancy group can be the designated forwarder of only particular types of traffic, such as frames and traffic of a particular type, size, or multi-cast form (e.g., multi-cast to less than all adjacent nodes versus multicast flooding). As an example, a particular PE node may be better configured for forwarding specialized traffic (e.g., traffic requiring higher bandwidth), while a second PE node in the same redundancy group may be better equipped to forward more typical traffic. Accordingly, PE nodes within a single redundancy group can be designated as the forwarders of particular types of traffic by the redundancy group, and these assignments can be correspondingly defined in records of a forwarding data structure.

Building, populating, updating, and otherwise writing to data structures (e.g., 475, 480), used in connection with certain loop and frame duplication avoidance techniques, can include the exchange of control plane messages between nodes within a particular network core (e.g., 420), including PE nodes of the core. Control plane messages can be exchanged, for example, to negotiate how traffic is to be forwarded by particular PE nodes in a redundancy group, as well as share knowledge, such as which CE nodes are connected to which PE nodes of in a VPLS instance. For example, a PE node (e.g., 405) can be configured to identify traffic from CE nodes outside the MPLS core 420. Upon identifying new CE nodes (e.g., 445, 450) connected to the PE node 405, the PE node 405 can exchange control plane messages with other nodes identifying that PE node 405 provides network access to the new CE node. Further, PE node 405 can generate hint data that corresponds to the newly identified CE node according to a particular protocol or algorithm. Moreover, PE node 405 can also include or supplement the control plane messages advertising the connection between PE1 405 and the newly identified CE node with messages advertising the hint data that corresponds to the newly identified CE node. In this way, data structures (e.g., 475) can be built and updated for use by other PE nodes in determining the original source of a frame forwarded into a core network 420 (such as illustrated in FIGS. 4A-4C).

Messages advertising hint data for a particular CE node can also include data identifying how the hint data is to be interpreted. For instance, different PE nodes and redundancy groups can adopt different protocols and rules for generating hints for use in identifying the originating CE node. For instance, the form and type of hint can vary, with some PE nodes assigning hints that at least partially mask the identity of the originating CE nodes and other PE nodes assigning hints that more transparently identify the originating CE node. For instance, a hint can specifically include at least a portion of the MAC address of the corresponding CE node. Additionally, different PE nodes can adopt different techniques and rules for appending or otherwise including the hint data in packets received by the PE node from the originating CE node and forwarded on to adjacent nodes of the MPLS core. Identifying how hint data will be integrated within traffic forwarded from the PE node can assist other PE nodes receiving the traffic to find and recognize the hint data in the forwarded frames. For instance, one or more PE nodes in a VPLS instance can include the hint within an MPLS header or shim, such as at the end of the MPLS header.

In some implementations, a typical VPLS solution can be augmented with control-plane based MAC (i.e., relating to the originating CE nodes) learning over an MPLS core using principles similar to those described above. A PE node can continue to perform other data-plane based learning over its ACs, but, in typically VPLS solutions, performs no such learning on traffic received from the MPLS core. MAC addresses (e.g., of CE nodes connected to other PE nodes in the VPLS instance) learned by a particular PE node over its ACs can be advertised, using BGP, to all other PE nodes in the same VPLS instance. Remote PE nodes receiving these BGP NLRIs can install forwarding entries, for the associated MAC addresses, in their respective VFI data records pointing to the PE node sending the advertisements. Multicast/broadcast traffic can be forwarded, for example, over a VPLS pseudowire full-mesh, or over an LSM tree.

In some instances, a PE node can automatically discover the identity of connected multi-homed CE nodes by extracting the link aggregation control protocol (LACP) system identifier from LACP data units (LACPDUs). A PE node can then advertise (e.g., in BGP) two routes for the connected CE node: a first route (MH-ID RG NLRI) that is tagged with an identifier for a particular redundancy group (RT-RG), an extended community which includes only the PE nodes that are in the same redundancy group (RG) (i.e., connected to the same CE node); and, second, the route which is tagged with an RT-VPN, an extended community which includes all the PE nodes participating in the VPNs connected to the CE node. An RT-RG and RT-VPN can each have a different well-known sub-type, but both can have a value set to the ID of the multi-homed CE device (MH-ID).

PE nodes interfacing with other PE nodes in a VPLS instance can also be auto-discovered. After PEs belonging to a given VPLS instance discover each other, an inclusive MP2MP MDT can be setup. In some instances, a full-mesh of PWs or a set of P2MP multi-cast delivery trees (MDTs) can be established. The MP2MP MDT, full-mesh of PWs, or set of P2MP MDTs can then be used for transporting customer multicast/broadcast frames and optionally for customer unknown unicast frames. In some implementations, no MAC address learning is needed for frames received over the full-mesh of PWs or the MDT(s). Further, customer Ethernet frames can be mapped to a VPLS instance (e.g., qualified learning versus unqualified learning), while MAC learning is accomplished over ACs using data plane messaging.

Control plane negotiations between PE nodes in a VPLS instance can include control plane messaging setting-up a designated forwarding node for a particular redundancy group as well as advertising of the designation to other nodes. Control plane negotiations and advertisements relating to the establishment of a designated forwarding node for a redundancy group can be broadcast to all or PE nodes in a VPLS instance or only to other PE nodes in the redundancy group.

In one particular implementation, negotiation of a designated forwarding node can involve the use of a new BGP attribute. More particularly, a DF-Election BGP attribute can be defined encoding information including type, an ordered list of PE nodes in the corresponding redundancy group (i.e. connected to the same site), the total number of in-service links connected to the site, the number of in-service links that the advertising PE node has connected to the site, the DF election state, sequence number, VLAN-group allocation to PEs, back-up DF information, among other information. This attribute can be used, for instance, to tag the multi-homed redundancy group NLRIs (but not the multi-homed VPN NLRIs).

Negotiating the designated forwarding node election between PE nodes in a particular redundancy group can include messages reporting diagnostics, tests, and other activities of the PE nodes relating to a determination of which PE node should be elected as a designated forwarding node. For instance, each PE node can run a timer to discover all the interfaced multi-homed CE node advertisements from other PE devices in the same redundancy group. Each PE node can create an ordered list of the members for the multi-homed site including itself. Each node, by default, can put all port states of redundancy group member links connected to the site in the blocking state. If no advertisement is received before the PE node's timer has expired, the PE node can then designate itself as the designated forwarder and put one of the ports connected to the site in the forwarding state. Alternatively, if the PE node is the first in the ordered list, then it designates itself as the designated forwarder and sends a designated forwarder-proposal to the other PE nodes in the list proposing that it be designated as a forwarder for the redundancy group. If the PE node sending the proposal thereafter receives approval of most or all of the remaining PE nodes in the redundancy group, it then can become the designated forwarder and puts its port in the forwarding state. However, if the PE node does not receive a requisite threshold of positive responses (or receives negative responses exceeding a threshold number or percentage of negative responses from other PE node) designation of the PE node as a designated forwarder for the redundancy group can be denied or remain unresolved. Resolution can be achieved, for example, through additional negotiation messages among the PE nodes.

Once a designated forwarder has been elected for a redundancy group, the designated forwarder can assign VLAN groups to each other PE node in the redundancy group. Each PE node can then become the assigned forwarder for its particular VLAN group. The designated forwarder can also assign one or more designated backup forwarders to take over forwarding for the VLAN group of any failed PE node in the redundancy group. Further, in some instances, an originally designated forwarding node can forfeit its status as a designated forwarder, for instance, by sending a control plane message to other PE nodes in the redundancy group. Forfeiture of the designated forwarder status can trigger renegotiation among the PE nodes to elect a new designated forwarder. Forfeiture of designated forwarder status can be prompted, for instance, in response to a proposal from another PE node with higher priority or one that is otherwise better enabled to handle forwarding for the redundancy group. In some instances, changes to a redundancy group's designated forwarding node can automatically prompt control plane messaging to other PE nodes in a VPLS instance notifying other PE nodes of the change and further prompting the updating of forwarding data structures identifying designated forwarding nodes for one or more redundancy groups.

Figure 5A:
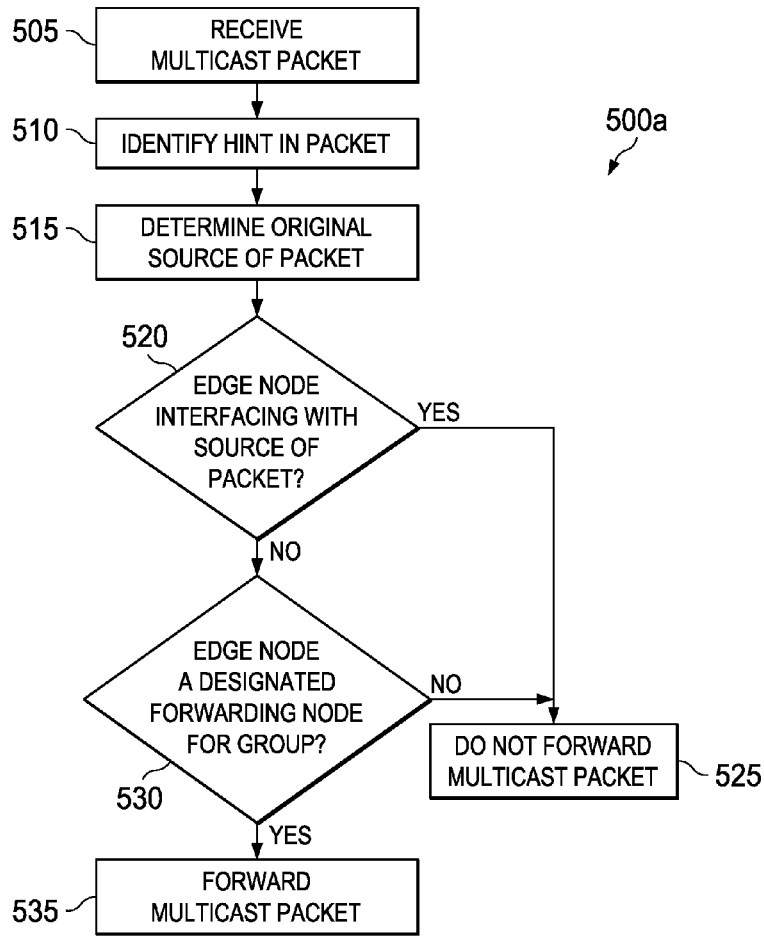
FIG. 5A is a simplified flowchart of an example technique for preventing looping and duplicate frame delivery in a communication system including at least one multi-homed device.

FIG. 5A is a simplified flowchart 500*a* of an example technique for preventing looping and duplicate frame delivery in a communication system (e.g., 100) including at least one multi-homed device. A multicast packet can be received 505 by an edge node device of a core network providing a particular edge device access to the network. The packet can be received 505 by another node in the core network. Hint data can be identified 510 within the received multicast packet and used to identify 515 a particular device from which the multicast packet originated and was introduced to nodes of the core network. Upon identifying 515 the source of the multicast packet, it can be determined 520 whether the edge node device is connected to, provides network access to, or otherwise interfaces with the particular CE device identified 515 from the hint data. Determining whether the edge node device interfaces with the particular CE source can assist in preventing the creation of a forwarding loop based on the received multicast packet. If it is determined that the edge node device interfaces with the identified CE device, the edge node device can elect 525 to not forward the received packet. If the edge node device instead determines that the edge node device does not interface with the CE source of the received multicast packet, it can be further determined 530 whether the edge node device is a designated forwarder of multicast traffic to the particular edge device to which it is connected. For instance, the edge node device can be one of a plurality of edge nodes included in a redundancy grouping of edge nodes, each edge node in the redundancy group interfacing with the particular CE edge device. Determining whether the edge node is the designated forwarder can assist in mitigating against the sending of duplicate copies of the received multicast packet by each of the edge devices in the redundancy group. Accordingly, if it is determined that the edge node is not the designated forwarder, the edge node again elects 525 not to forward the received packet. On the other hand, if the edge node determines that it is not connected to the source CE device and is the designated forwarding node, it can forward 535 the received multicast packet to the particular CE device.

Figure 5B:
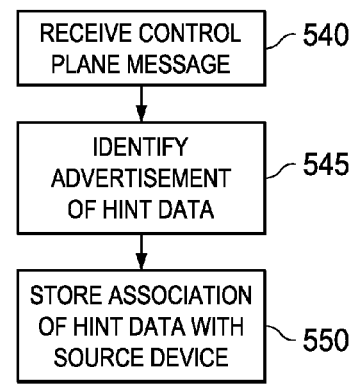
FIG. 5B is a simplified flowchart of an example technique for negotiating learning between multiple nodes in a communication system.

Turning to FIG. 5B, a simplified flowchart 500b shows an example technique for negotiating learning between multiple nodes in a communication system (e.g., 100). A control plane message can be received 540 from another, particular edge node in a plurality of edge nodes included in a plurality of network elements of a network. Data can be identified 545 in the received control plane message specifying that particular hint data is to be included in multicast packets originating from a particular packet source (e.g., CE) device interfaced with the first edge node and forwarded to the network through the first edge node. A data record can be stored 550, in one or more memory devices, identifying the association between the first hint and the particular packet source device. Additional data can also be stored in the record, including an indication that the particular source device interfaces with the first edge node. Further, the data record can be used to determine that subsequently received multicast packets that include the first hint originate from the first computing device and should not be forwarded to the first computing device by the first edge node, in connection with a loop avoidance protocol.

Note that in certain example implementations, forwarding determination, loop avoidance, and duplicate frame delivery avoidance functions outlined herein may be implemented by logic encoded in one or more tangible media (e.g., embedded logic provided in an application specific integrated circuit [ASIC], digital signal processor [DSP] instructions, software [potentially inclusive of object code and source code] to be executed by a processor, or other similar machine, etc.). In some of these instances, a memory element (e.g., 320 as shown in FIG. 3) can store data used for the operations described herein. This includes the memory element being able to store software, logic, code, or processor instructions that are executed to carry out the activities described in this Specification. A processor can execute any type of instructions associated with the data to achieve the operations detailed herein in this Specification. In one example, the processor (e.g., 315, as shown in FIG. 3) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

In one example implementation, networking devices such as those shown or described in connection in any one of the above figures, may include software in order to achieve any of the functions outlined herein. Such networking devices can include memory elements for storing information to be used in achieving the functions and activities discussed herein. Additionally, such networking devices can further include a processor that can execute software or an algorithm to perform the operations and features disclosed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, data structure, data record, tables, trees, cache, etc.) should be construed as being encompassed within the broad term "memory element." Similarly, any of the potential processing elements, modules, and machines described in this Specification should be construed as being encompassed within the broad term "processor." Each of the network elements can also include suitable interfaces for receiving, transmitting, and/or otherwise communicating data or information in a network environment.

Note that with the example provided above, as well as numerous other examples provided herein, interaction may be described in terms of two, three, or four network elements, devices, or components. However, this has been done for purposes of illustration and example only. In certain cases, it may be easier to describe one or more of the functionalities of a given set of flows by only referencing a limited number of network elements. It should be appreciated that the described services and systems (e.g., 100) (and corresponding teachings) can be readily scalable and can accommodate a large number of components, as well as far more complicated/sophisticated arrangements and configurations. Accordingly, the examples provided should not limit the scope or inhibit the broad teachings of the above systems and services as potentially applied to a myriad of other architectures.

It is also important to note that the steps in the preceding flow diagrams illustrate only some of the possible signaling scenarios and patterns that may be executed by, or within, a communication system. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by a communication system (e.g., 100) in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols (e.g., IGP, IGMP, etc.), communication system 10 may be applicable to other protocols and arrangements. Moreover, the present disclosure is equally applicable to various technologies, aside from DSL architectures, as these have only been offered for purposes of discussion. Along similar lines, communication systems implementing some or all of the above-disclosed features can be extended to any Multi-Protocol Label Switching (MPLS) architecture. Similarly, the teachings presented herein can also be used in loop free alternate (LFA) configurations in other embodiments.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking, cloud, and parallel processing may be advantageous.

What is claimed is:

1. A computer-implemented method comprising:
   receiving a first control plane message from a first edge node in a plurality of edge nodes included in a plurality of network elements of a network, the first control plane message identifying a first hint to be included in first multicast packets that include data originating from a first computing device interfaced with the first edge node and are forwarded to the network through the first edge node, wherein the first hint is to be added to the first multicast packets following transmission of the first multicast data packets by the first computing device;
   storing, in a memory device, a data record identifying the association between the first hint and the first computing device,
   wherein the data record is for use in interpreting hints included in received multicast packets to determine whether the multicast packets include the first hint and originate from the first computing device, and wherein multicast packets including data originating from the first computing device are not to be forwarded to the first computing device by edge nodes, in the plurality of edge nodes, interfacing with the first computing device.

2. The method of claim 1, further comprising storing an indication that the first edge node interfaces with the first computing device.

3. The method of claim 1, wherein the data record is used to determine that received multicast packets including the first hint should not be forwarded to the first computing device in order to avoid looping of the received multicast packets.

4. The method of claim 1, wherein the first computing device is a customer-side edge network device.

5. The method of claim 1, further comprising:
   identifying a particular computing device interfaced with a second edge node device;
   generating a particular hint corresponding to the particular computing device, the particular hint for inclusion in multicast packets that include data originating from the particular computing device and are forwarded to other edge nodes in the plurality of edge nodes; and
   sending a second control plane message to other edge nodes in the plurality of edge nodes advertising that:
   the second edge node device interfaces with the particular computing device; and
   the particular hint corresponds to the particular computing device.

6. The method of claim 5, further comprising updating the data record to identify the association between the particular hint and the particular computing device.

7. The method of claim 5, wherein the first control plane message is received by the second edge node device.

8. The method of claim 1, wherein the first edge node is included in a redundancy group including a first set of edge nodes included in the plurality of network edge nodes, each node in the first set of edge nodes interfacing with the first computing device, and the first set of edge nodes including at least other edge node in addition to the first edge node.

9. The method of claim 8, further comprising:
   receiving a second control plane message identifying that the first edge node is a designated forwarder for the redundancy group; and
   storing, in a memory device, a data record identifying that the first edge node is a designated forwarder for the redundancy group.

10. The method of claim 8, wherein the second control plane message is directed to edge nodes in the first set of edge nodes.

11. The method of claim 1, wherein the first control plane message includes information identifying how the first hint is to be included in the first multicast packets and the information is included in the data record identifying the association between the first hint and the first edge node.

12. The method of claim 11, wherein the information identifies that the first hint will be included in MPLS labels of the first multicast data packets.

13. The method of claim 1, wherein the first hint identifies a MAC address of the first computing device.

14. The method of claim 1, wherein the data record is shared by at least two edge nodes in the plurality of edge nodes.

15. An article comprising a non-transitory, machine-readable storage device storing instructions operable to cause at least one processor to perform operations comprising:
   receiving a first control plane message from a first edge node in a plurality of edge nodes included in a plurality of network elements of a network, the first control plane message identifying a first hint to be included in first multicast packets including data originating from a first computing device interfaced with the first edge node and forwarded to the network through the first edge node, wherein the first hint is to be added to the first multicast packets following transmission of the first multicast data packets by the first computing device; and
   storing, in a memory device, a data record identifying the association between the first hint and the first computing device,
   wherein the data record is for use in interpreting hints included in received multicast packets to determine whether the multicast packets include the first hint and originate from the first computing device, and wherein multicast packets including data originating from the first computing device are not to be forwarded to the first computing device by edge nodes, in the plurality of edge nodes, interfacing with the first computing device.

16. An apparatus comprising:
   a memory element storing data;
   a processor operable to execute instructions associated with the stored data; and
   a control plane negotiation module configured to:
   receive a first control plane message from a first edge node in a plurality of edge nodes included in a plurality of network elements of a network, the first control plane message identifying a first hint to be included in first multicast packets including data originating from a first computing device interfaced with the first edge node and forwarded to the network through the first edge node, wherein the first hint is to be added to the first multicast packets following transmission of the first multicast data packets by the first computing device;

store, in the memory element, a data record identifying the association between the first hint and the first computing device;

wherein the data record is for use in interpreting hints included in received multicast packets to determine whether the multicast packets include the first hint and originate from the first computing device, and wherein multicast packets including data originating from the first computing device are not to be forwarded to the first computing device by edge nodes interfacing with the first computing device.

17. The apparatus of claim 16, further comprising a second edge node in the plurality of edge nodes.

18. The apparatus of claim 16, wherein the first edge node is included in a redundancy group including a set of edge nodes including the first edge node and at least one other edge node from the plurality of edge nodes, each of the edge nodes in the plurality of edge nodes interfacing with the first computing device, and the memory element stores forwarding data identifying at least one designated forwarding node for the redundancy group.

19. The apparatus of claim 16, further comprising a hint generation module configured to:
   identify a particular computing device interfaced with a second edge node device;
   generate a particular hint corresponding to the particular computing device, the particular hint for inclusion in multicast packets including data originating from the particular computing device and forwarded to other edge nodes in the plurality of edge nodes; and
   send a second control plane message to other edge nodes in the plurality of edge nodes advertising that:
      the second edge node device interfaces with the particular computing device; and
      the particular hint corresponds to the particular computing device.

20. The apparatus of claim 19, wherein the second control plane message is sent to each edge node in the plurality of edge nodes excepting the second edge node.

* * * * *